July 12, 1932. E. W. PATTERSON 1,866,903
OIL SAVER
Filed Sept. 1, 1931
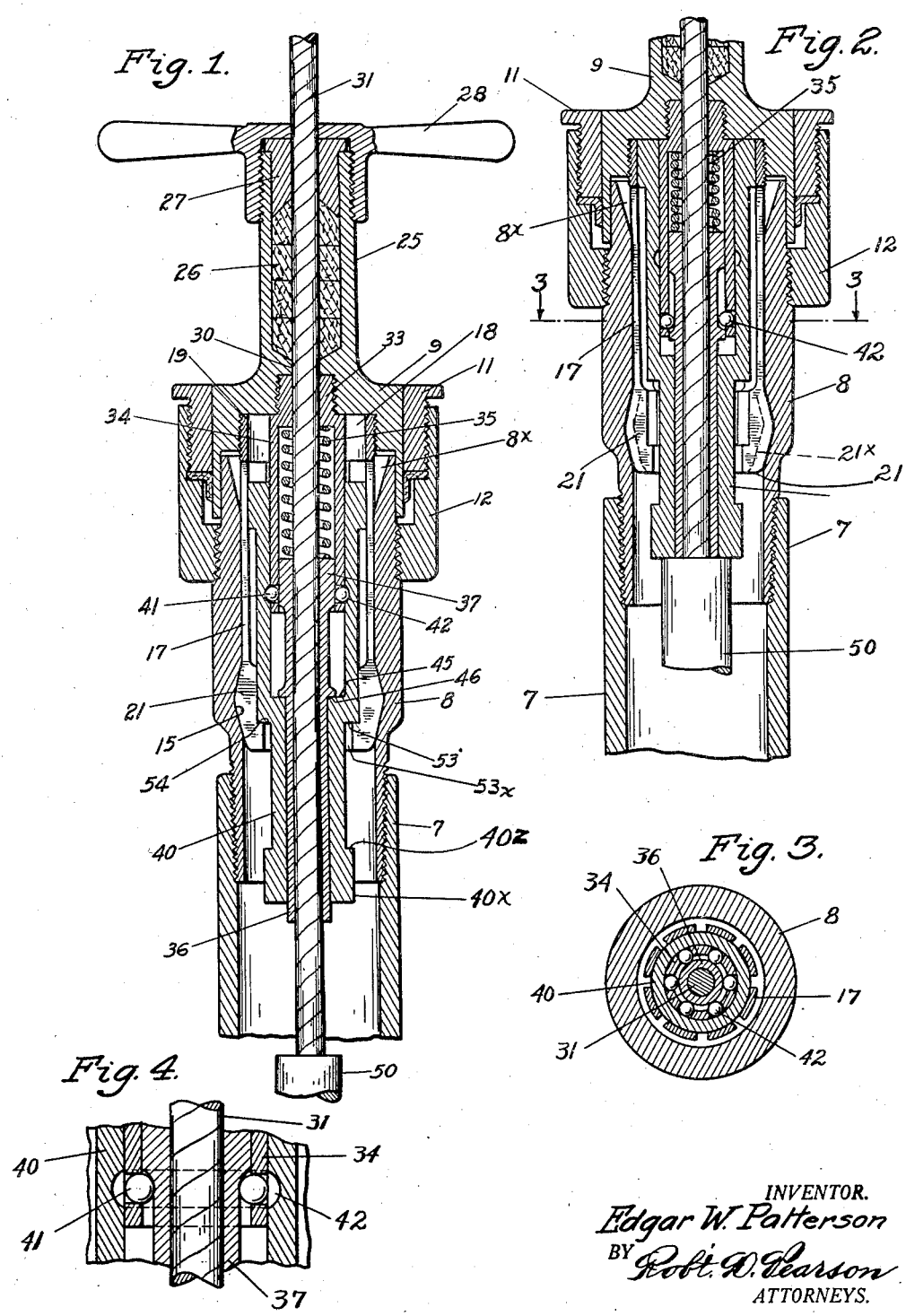

Patented July 12, 1932

1,866,903

UNITED STATES PATENT OFFICE

EDGAR W. PATTERSON, OF LOS ANGELES, CALIFORNIA

OIL SAVER

Application filed September 1, 1931. Serial No. 560,605.

This invention relates to an oil saver of the kind adapted to be secured to the upper end of a well casing for the purpose of preventing waste of oil around the cable during the operations of drilling, swabbing and bailing. More specifically the invention pertains to the type of oil saver in which a cap construction which normally closes the upper end of the well casing will be released by a device which is operated when an enlargement formed upon or carried by the cable strikes said device in case the cable and tools carried thereby pass beyond their normal upper limit of travel.

An oil saver of the above character has been described and claimed in my co-pending application, Serial Number 500,364, filed December 5, 1930. An object of the present invention is to provide an auxiliary locking device to cooperate with the locking construction shown in my said co-pending application, said auxiliary locking device being adapted more effectually to safeguard the oil saving construction which is attached to the top of the well casing from being displaced during the normal reciprocation of the cable which carries the drilling tools or other tools.

A further object of the invention is to devise a construction wherein there is less friction between the cable and part of the locking device which cooperates therewith, thus further safeguarding against accidental displacement of the head or cap during the normal operations of the cable.

Other objects, advantages and features of invention may hereinafter appear.

Referring to the accompanying drawing which illustrates what is at present deemed to be a preferred embodiment of the invention, Fig. 1 is a vertical axial section through the oil saver showing the locking device associated therewith in the locked position.

Fig. 2 is a section similar to Fig. 1 showing the parts of the locking device in the unlocked position.

Fig. 3 is a transverse section on line 3—3 of Fig. 2.

Fig. 4 is a reproduction on an enlarged scale of the ball-locking portion of the device shown in Figs. 1 and 2, the balls being shown in the retracted position.

Referring in detail to the drawing, the upper part 7 of the well casing has screwed thereinto the tubular shank 8 of the oil saving device around the upper end portion of which is fitted the tubular cap 9, said cap in turn being surrounded by the externally threaded packing nut 11. The shank 8 is also externally threaded, an annular coupling member 12 having a screw threaded connection with both the shank and packing nut to maintain them in the operative position.

The shank 8 is provided with an internal annular groove 15 having sloping sides which form inclined surfaces to co-act with the spring arms 17 of the catch barrel 18. Said catch barrel is externally screw threaded at its upper end and is thereby secured within an internally screw threaded socket 19 provided therefor within the cap 9. Each of the spring arms 17 of the catch barrel is provided with a thickened lower portion having an outwardly directed mound 21 which corresponds in shape to the bevelled annular groove 10 with which it cooperates.

The cap 9 is provided with a tubular upper extension 25 to form a packing gland which contains packing 26 held in place by a retaining nut 27, a gland nut 28 being shown screwed on to the extension 25 of the cap. Below the packing 26 the cap 9 is provided with a contracted axial bore 30 through which the cable 31 reciprocates. Below this bore the cable is provided with an internally screw threaded socket into which is screwed the shank 33 of a thimble 34 which contains a compression spring 35. The lower end of said compression spring abuts against the upper end of an internal sleeve 36 which has an enlarged upper part 37 that has a working fit within the lower portion of said thimble.

Said sleeve 36 and thimble 34 are both surrounded by an open ended barrel or sleeve member 40. Near its lower end thimble 34 is provided with a series of bearing apertures to receive the bearing balls 41, and the barrel 40 is provided with an internal circumferential groove 42 within which said balls are normally seated, the diameters of said balls being uniform and being slightly greater than the thickness of the wall of the thimble 34. The lower portion of the internal sleeve 36 has a working fit within the lower portion of the barrel 40, said barrel being provided with an internally projecting ledge or shoulder 45 and the internal sleeve being provided with an external annular shoulder 46 which normally rests upon said ledge 45. The difference in diameter between the enlarged upper portion of the sleeve 36 and the body portion of said sleeve is sufficient to permit, at times, the balls 41 to retract within the internal diameter of the portion of the barrel 40 within which they are seated. Such retraction of the balls can occur only when the internal sleeve 36 has been moved up against the opposition of the spring 35 a sufficient distance to permit said balls to engage the body portion of the internal sleeve at its enlargement 37. The lower end of the internal sleeve 36 projects sufficiently below the lower end of the barrel 40 to cause said balls to be disengaged from the barrel as above stated whenever the lower end of said sleeve is moved up into alinement with the lower end of said barrel. The cable 31 is provided with or attached to the striking part 51 which is adapted at times to lift the internal sleeve 36 with relation to the barrel 40 as just stated.

The barrel 40 is provided with an external ledge or annular shoulder 53, and each one of the spring arms 17 is provided near its lower end with an internally directed shoulder 54 to cooperate with said ledge 53.

Referring to certain details of construction, the tubular body 8 is shown provided with an internal bevel 8x at its upper end which facilitates the insertion of the spring arms 17. The barrel 40 is shown provided at its lower end with a diametrical enlargement 40x thus forming a shoulder 40z which may at times engage the enlarged lower ends of the spring arms 17.

The compression spring 35, which abuts against the upper end of the inner sleeve 37, not only normally keeps said sleeve down in position to lock the inner locking device, that is the ball controlled locking device, but said spring also, by means of the engagement of the annular shoulder 46 with the shoulder 45 of the barrel, normally keeps the barrel down in place to lock the outer locking device. It will therefore be seen that a single spring serves to return both locking devices to their normal positions.

Normally there is a clearance 53x between the lower ends of arms 17 and the barrel 40. This clearance is sufficient to allow said arms to be sprung into contact with the barrel when the latter is at the upper limit of its movements.

In preparing the device for use the tubular body 8 is screwed within the top of the well casing 7, and the coupling 12 is then screwed upon the upper end of said body whereupon the packing nut 11 is screwed in place within said coupling. The thimble 34, catch barrel 18 and parts carried by them are next secured within the nut 9 and the cable is threaded through these parts, then the nut 9 is slipped down into place together with the parts secured to it.

In operation the spring arms 17 normally spring out into engagement with the bevelled groove 15 and at the same time the balls 41 project outwardly into the groove 42, thus forming a double locking means to lock the cap 9 in place. When the cable 31 is drawn up beyond the normal limit of its travel, the part 50 suspended thereby will strike against the lower end of the internal sleeve 26 thereby moving said sleeve upwardly until the balls 41 are permitted to enter the diametrically reduced portion thereof, thus releasing said balls from the groove 42 and unlocking the barrel 40 from the thimble 34. A farther upward movement of the cable will cause the part 50 to engage the lower end of the barrel 40 thereby moving said barrel up until the thickened portions 21 of the spring arms 17 come opposite to the diametrically reduced portion of the barrel 40, thereby permitting said arms to be sprung inwardly from the groove 15 and thus unlocking the barrel 40 from the tubular body 8 as shown in Fig. 2. These operations cause the cap 9 to be completely unlocked from the cap 8 and hence said cap may by a still farther upward movement of the cable be completely freed from the tubular body 8.

In the central portion of Fig. 2 the dotted lines 21x at each side of the mid-width of the view indicating the distance with the thickened portions 21 of the spring arms 17 move toward the axis of the device in order to free themselves from the tubular body 8, the locking means is completely released by the upward movement of the part 50 carried by the cable, as already described.

I claim:

1. An oil saver comprising a tubular body adapted for attachment to the upper end of a well casing, a cap construction fitted to the upper end of said body and having a passage through which the cable may extend, and locking means normally to lock said cap to said body, said locking means comprising two concentric members movable with relation to each other both of which are adapted to be disposed concentrically of the cable, one of said members normally projecting below the other, whereby a part carried by said cable may engage first one and then both of said members, said locking means comprising two locking devices one of which is operated by one of said members and the other of which is operated by the other of said members.

2. An oil saver comprising a tubular body adapted for attachment to the upper end of a well casing, a cap construction fitted to the upper end of said body and having a passage through which the cable may extend, and locking means normally to lock said cap to said body, said locking means comprising two concentric members movable with relation to each other both of which are adapted to be disposed concentrically of the cable, one of said members normally projecting below the other, whereby a part carried by said cable may engage first one and then both of said members, a locking device located between the outer concentric member and the wall of said tubular body to at times lock said outer concentric member against longitudinal movement with relation to said tubular body, said inner concentric member normally projecting below the lower end of said outer concentric member, an internal locking device between said concentric members, and a part carried by the cable and adapted when the cable is moved up beyond a predetermined limit first to engage said inner concentric member and slide the same upwardly within the outer concentric member thereby operating the inner locking device, and upon farther upward movement to engage the outer concentric member and thereby release the locking device between the last recited concentric member and the wall of the tubular body, whereupon a farther upward movement of the cable will lift the cap with relation to said tubular body.

3. An oil saver comprising a lower section attachable to the top of a well casing, a cap detachably mounted upon said lower section and having a passage for a cable to extend therethrough; catch means mounted on to said cap with surfaces for coaction with surfaces formed on said lower section to secure said cap thereto, a longitudinally movable retainer disposed within said catch means and adapted at one longitudinal position to lock said catch means to said lower section in cap securing position and in another longitudinal position to unlock said catch means, whereby a part carried by said cable may engage said retainer and move it to an unlocking position and thereby enable said cap to be detached from said lower section, and an auxiliary locking device also operable by said part to safeguard the first recited locking device from being displaced by the friction of said cable.

4. An oil saver comprising a tubular body adapted for attachment to the upper end of a well casing, a cap construction fitted to the upper end of said body and having a passage through which the cable may extend, and locking means normally to lock said cap to said body, said locking means comprising two concentric tubular members having a working fit with relation to each other whereby a relative longitudinal movement between them is permitted, the inner member being adapted to have the cable extend slidably through it, one of said members normally projecting below the other whereby a part carried by said cable may engage such member first and move it upwardly with relation to the other member and may thereafter move both of said members upwardly, said locking means comprising two locking devices one of which is operated by one of said members and the other of which is operated by the other of said members, and a spring constructed and arranged to return both of said relatively movable members to their normal positions.

5. An oil saver comprising tubular body adapted for attachment to the upper end of a well casing, a cap construction fitted to the upper end of said body and having a passage through which the cable may extend, and locking means normally to lock said cap to said body, said locking means comprising a thimble of greater internal diameter than the cable and having a bore through which said cable is slidable, an outer sleeve or barrel slidably fitted over said thimble, an inner sleeve slidably fitted within said thimble, said inner sleeve having a bore through which the cable has a sliding fit, said thimble having a series of bearing apertures extending therethrough and bearing balls in said apertures, and said outer sleeve having an internal seat which normally receives a portion of said bearing balls, a compression spring within said thimble tending to hold said inner sleeve in a position to maintain said balls in the seats of said outer sleeve thereby normally locking said outer sleeve against longitudinal movement with relation to said thimble, a portion of said internal sleeve being of less external diameter than the portion thereof which normally engages said bearing balls, and a part carried by the cable and adapted to strike against said inner sleeve and thereby move it to a position wherein the diametrically reduced portion thereof is brought into alinement with said bearing balls thereby releasing said balls from the seats in said outer sleeve and thus unlocking said outer sleeve from said thimble to permit relative longitudinal movement of said sleeve with relation to said thimble.

In testimony whereof I hereunto affix my signature.

EDGAR W. PATTERSON.